United States Patent [19]

Smith

[11] 4,039,606
[45] Aug. 2, 1977

[54] UNSATURATED RESIN BLENDS

[75] Inventor: Harry A. Smith, Midland, Mich.

[73] Assignee: The Dow Chemical Company, Midland, Mich.

[21] Appl. No.: 662,391

[22] Filed: Mar. 1, 1976

[51] Int. Cl.$^2$ ................ C08L 67/06; C08L 45/00
[52] U.S. Cl. ........................... 260/829; 260/52; 260/67 A; 260/67 S; 260/67 UA; 260/861; 260/869; 260/870
[58] Field of Search ............ 260/829, 861, 869, 870

[56] References Cited
U.S. PATENT DOCUMENTS 3,914,194  10/1975  Smith ........................... 260/18 R

FOREIGN PATENT DOCUMENTS 42-10,619  9/1967  Japan ........................... 260/861
47-13,623  4/1972  Japan ........................... 260/861
764,582  12/1956  United Kingdom ........... 260/861

Primary Examiner—Paul Lieberman
Attorney, Agent, or Firm—Ronald G. Brookens

[57] ABSTRACT

New curable compositions, comprising (1) a mixture of (a) from about 5 to about 90 percent by weight of a diaryl compound-formaldehyde copolymer resin and (b) from about 95 to about 10 percent by weight of an unsaturated polyester resin, and (2) a polymerizable ethylenically unsaturated liquid monomer. Component (1) normally is present in amounts of from 20 to 75 weight percent based on the combined weights of (1) and (2).

9 Claims, No Drawings

UNSATURATED RESIN BLENDS

BACKGROUND OF THE INVENTION

Reinforced plastics constitute a very large portion of the plastics industry. Products typically made from reinforced plastics include missile and aircraft sections, boats, automobile bodies, building panels, tanks, fishing rods, etc. Resins used for the production of such plastics include polyester, epoxy, phenolic, and silicone. The polyester resins have heretofore made up the greater portion of resinous materials utilized in the reinforced plastics industry largely because of their better reactivity and physical properties when compared to other resins. Such resins, however, still do not have the optimum combination of mechanical strength, reactivity and other properties.

SUMMARY OF THE INVENTION

Novel resin blends have now been discovered comprising (1) a mixture of (a) from about 5 to about 90 percent by weight of a diaryl compound-formaldehyde copolymer resin and (b) from about 95 to about 10 percent by weight of an unsaturated polyester resin, and (2) a polymerizable ethylenically unsaturated liquid monomer, wherein (1) is present in an amount from about 20 to 75 weight percent based on the combined weights of (1) and (2).

The blends prepared as described above are useful as matrix resins in plastic reinforced with such material as glass cloth, quartz cloth, or carbon cloth. The resins are also useful as sheet molding compounds, coating resins, or as resins which impart corrosion resistant properties to laminates. In addition, these curable compositions unexpectedly provide greater reactivity and better properties than any of the components used individually.

DETAILED DESCRIPTION OF THE INVENTION

The diaryl compound-formaldehyde copolymer resins which are useful in the practice of the present invention are known compounds. They are specifically detailed in U.S. Pat. No. 3,914,194 (the disclosure of which is incorporated herein by reference). They have the following repeating units:

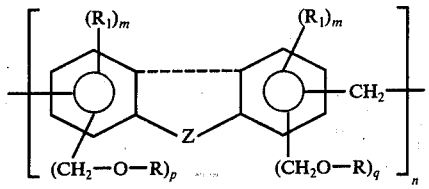

wherein R is an aliphatic acyl group derived from saturated acids having 2–6 carbons, olefinically unsaturated acids having 3–20 carbons, or an omega-carboxy-aliphatic acyl group derived from olefinically unsaturated dicarboxylic acids having 4–12 carbons or mixtures thereof; each $R_1$ is independently hydrogen, alkyl of 1 to 10 carbon atoms, or halogen; Z is oxygen or sulfur; the group represented by Z taken with the dotted line represents dibenzofuran and dibenzothiophene moieties, or mixtures thereof; n is a whole number sufficient to give a weight average molecular weight greater than about 500; m is 0-2; p and q have an average value of 0 to 1 with the proviso that the total number of p and q are sufficient to give greater than one unsaturated group per resin molecule (i.e., the product of $n (p + q)$ is greater than an average value of 1.0 and preferably greater than 1.5).

These resins are generally prepared by reacting a mole of a diaryl compound such as diphenyl oxide, diphenyl sulfide, dibenzofuran, and the like with about 1.1 to about 10 moles of formaldehyde per mole of diaryl compound and about 1 to about 10 moles of an olefinically unsaturated monocarboxylic acid having 3 or more carbons or about 0.1 to about 5 moles per mole of diaryl compound of an olefinically unsaturated dicarboxylic acid or mixtures thereof.

Resins may also be prepared from the alkylated derivatives of the foregoing type compounds wherein one or both aromatic rings are substituted by alkyl groups of 1–10 carbons. If desired, the diaryl type compounds set forth above can be halogenated in one or both aromatic rings with fluorine, chlorine, bromine, or iodine groups. It is preferred to use the chloro- or bromo- derivatives. Diphenyl oxide or diphenyl sulfide are preferred for economic reasons.

The reaction takes place in the presence of a catalytic amount of a strong inorganic or organic acid at a temperature range of from about 90° C to about 150° C. These acid catalysts should have a $pK_a$ of less than 0.5 in $H_2O$. Useful acid catalysts are sulfuric, perchloric, hydrochloric, and the like.

The resins thus prepared are recovered from the reaction media by precipitation with water, filtering and washing.

The present unsaturated resin blends also comprise from about 95 to about 10 percent by weight of an ethylenically unsaturated polyester resin. This is likewise a known class of compounds which are generally prepared by interpolymerizing an ethylenically unsaturated dicarboxylic acid or anyhydride (such as maleic acid, fumaric acid, itaconic acid and the like and the corresponding anhydrides) with an alkylene glycol or polyalkylene glycol having a molecular weight of about 1,000 to 8,000 or thereabouts.

The preferred polyester resin for practice of the present invention is a 1:1 mole ratio of maleic anhydride/propylene glycol resin containing some dipropylene glycol units.

The instant resin blend also requires the presence of a polymerizable unsaturated monomer which constitutes from about 25 to about 80 percent of the final curable composition.

These resins are useful in that they can be mixed with reactive diluents such as vinyl aromatic monomers, alkyl esters of olefinically unsaturated carboxylic acids, vinyl esters of carboxylic acids and mixtures thereof.

Examples of such reactive diluents are styrene, chlorostyrene, t-butyl styrene, methyl acrylate, ethyl acrylate, methyl methacrylate, ethyl methacrylate, vinyl acetate, vinyl n-butyrate and vinyl benzoate.

The preferred polymerizable monomer for use herein is styrene.

These curable mixtures are then mixed with conventional polymerization initiators such as benzoyl peroxides, t-butyl peroxide, t-butyl peroxypivalate, methyl ethyl ketone peroxide and mixtures thereof. Other free radical initiators include t-butyl hydroperoxide, cumene peroxide, and azobisisobutyronitrile.

The method used to determine the reactivity (cure rate) of the instant resin blends is the Society of Plastics Industry (SPI) gel time test as described in detail on pages 51-2 of the "Handbook of Reinforced Plastics." This test yields gel time (t gel), the temperature at which exotherm starts as the kick-off temperature ($T_k$), the peak exotherm temperature (T exo), and the time to the peak exotherm (t exo) which is equivalent to a cure time.

The following examples are given for illustrating specific modes of practicing the invention. These examples are not to be viewed as a limitation thereof. All percentages listed herein are by weight.

EXAMPLE 1

A mixture was made comprising 37.0 g of unsaturated diphenyl oxide (DPO) resin containing 39.2% styrene, 9.1 g of styrene, and 2.9 g of an unsaturated polyester resin made from a 1:1 ratio of maleic anhydride/propylene glycol with some dipropylene glycol units (Rohm and Haas, P-340) containing 36.0% styrene, This mixture (Blend A) contained 50% styrene, 45% DPO resin, and 5% P-340 resin. To it was added 0.91 g of a paste of 55% benzoyl peroxide in tricresol phosphate. Three samples were taken for the SPI gel time test at 180° F. The gel time as defined by the test was 4 minutes, 47 seconds (4'47") with a peak exotherm temperature of 151° C.

EXAMPLE 2

The procedure of Example 1 was repeated using blends having 50% styrene and 37.5%, 25%, 12.5%, and 5% unsaturated DPO resin with the remainder being P-340 resin. The 180° F SPI gel time results are given in the accompanying Table I along with the component resins alone and using the amount and type of catalyst indicated in 0.1. Blends B and G are for comparison only.

TABLE I

| Blend | B | C | D | E | F | G |
|---|---|---|---|---|---|---|
| % DPO resin | 50.0 | 37.5 | 25 | 12.5 | 5 | 0 |
| t gel | 8'5" | 3'57" | 3'57" | 4'1" | 4'12" | 5'7" |
| Peak exotherm temperature | 131° C | 176° C | 207° C | 227° C | 236° C | 242° C |

EXAMPLE 3

The resins of Example 1 and Example 2, blends B, C, D and G were cast into mechanical property testing specimens and evaluated for flexural strength, flexural modulus (ASTM Test No. D 790-63), and notched Izod impact resistance (ASTM Test No. D 256-56). The results are given in Table II. The cure was 17 hours at 80° C plus 1 hour at 140° C and 1 hour at 200° C. The initiator was 0.5% benzoyl peroxide plus 0.5% t-butyl peroxide.

TABLE II

| Blend Designation | B | A | C | D | G |
|---|---|---|---|---|---|
| % DPO | 50 | 45 | 37.5 | 25 | 0 |
| Flexural strength (psi) | $11.3 \times 10^3$ | $10.0 \times 10^3$ | $11.9 \times 10^3$ | $11.4 \times 10^3$ | $2.9 \times 10^3$ |
| Flexural modulus (psi) | $7.8 \times 10^5$ | $5.6 \times 10^5$ | $5.5 \times 10^5$ | $5.6 \times 10^5$ | $4.0 \times 10^5$ |
| Notched Izod (ft. lbs/in. notch) | 0.8-1 | 0.8 | 1.1-1.2 | 0.5 | 0.4 |

EXAMPLE 4

To show the effect of styrene levels, blends were prepared with a ratio of DPO resin to P-340 of 9/1 and 3/1 with varying styrene levels. These data are given in Table III using the cures and initiator of Example 3 for mechanical properties and that of Example 1 for gel times.

TABLE III

| Blend Designation | H | A | J | K | C | L |
|---|---|---|---|---|---|---|
| DPO Resin/p-340® | 9/1 | 9/1 | 9/1 | 3/1 | 3/1 | 3/1 |
| % Styrene | 40.4 | 50 | 65 | 39.6 | 50 | 65 |
| Gel Time (180° F SPI) | 4'2" | 4'47" | 4'10" | 4'22" | 3'57" | 3'31" |
| Peak Exotherm temp. | 160° C | 151° C | 175° C | 170° C | 176° C | 189° C |
| Flexural Strength (psi) | $8.2 \times 10^3$ | $10.0 \times 10^3$ | $7.3 \times 10^3$b | $8 \times 10^3$ | $11.9 \times 10^3$ | $7.4 \times 10^3$ |
| Flexural Modulus (psi) | $12.5 \times 10^5$ | $5.6 \times 10^5$ | $8.0 \times 10^5$ | $8.2 \times 10^5$ | $5.5 \times 10^5$ | $6.0 \times 10^5$ |
| Notched Izod (ft lbs/in notch) | 0.8-1.1 | 0.8 | 0.6 | 0.8 | 1.1-1.2 | 0.7-0.9 |

What is claimed is:

1. A composition of matter comprising (1) a mixture of (a) from about 5 to about 90 percent by weight of a diaryl compound-formaldehyde copolymer resin having pendent unsaturated groups with the repeating units:

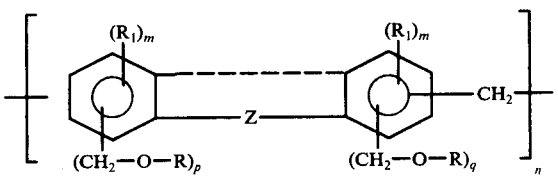

wherein R is an aliphatic acyl group derived from saturated acids having 2-6 carbons, olefinically unsaturated acids having 3-20 carbons, or an omega-carboxy-aliphatic acyl group derived from unsaturated dicarboxylic acids having 4-12 carbons or mixtures thereof, $R_1$ is independently hydrogen, an alkyl group of 1-10 carbon atoms, or halogen, Z is selected from oxygen or sulfur, the group represented by Z taken with the dotted line represents dibenzofuran and dibenzothiophene moieties, or mixtures thereof, n is a whole number sufficient to give a weight average molecular weight greater than about 500, m is 0-2, and p and q have an average value of 0 to 1 with the proviso that the total number of p and q groups are sufficient to give greater than one unsaturated group per resin molecule, and (b) from about 95 to about 10 percent by weight of an unsaturated polyester resin, and (2) a polymerizable ethylenically unsaturated liquid monomer, wherein (1) is present in an amount from about 20 to 75 weight percent based on the combined weights of (1) and (2).

2. The composition of claim 1 wherein said diaryl compound-formaldehyde copolymer resin is a resin having pendent unsaturated groups with the repeating units:

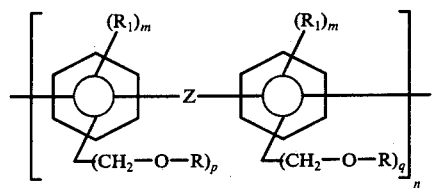

wherein R is an aliphatic acyl group derived from saturated acids of 2-6 carbons, olefinically unsaturated acids having 3-20 carbons or an omega-carboxy aliphatic acyl group derived from olefinically unsaturated dicarboxylic acids having 4-12 carbons or mixtures thereof, $R_1$ is independently hydrogen, an alkyl group of 1-10 carbon atoms, or halogen, Z is selected from oxygen or sulfur, n is a whole number sufficient to give a weight average molecular weight greater than about 500, m is 0-2, p and q have an average value of 0-1 with the proviso that the total number of p and q groups are sufficient to give greater than one unsaturated group per resin molecule.

3. The composition of claim 1 wherein said diaryl compound-formaldehyde copolymer resin is a resin having pendent unsaturated groups with the repeating unit:

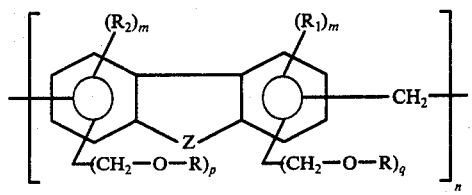

wherein R is an aliphatic acyl group derived from saturated acids of 2-6 carbons, olefinically unsaturated acids having 3-20 carbons or an omega-carboxy aliphatic acyl group derived from olefinically unsaturated dicarboxylic acids having 4-12 carbons or mixtures thereof, $R_1$ is independently hydrogen, an alkyl group of 1-10 carbon atoms, or halogen, Z is selected from oxygen or sulfur, n is a whole number sufficient to give a weight average molecular weight greater than about 500, m is 0-2, p and q have an average value of 0-1 with the proviso that the total number of p and q groups are sufficient to give greater than one unsaturated group per resin molecule.

4. The diaryl compound-formaldehyde copolymer resin as set forth in claim 1 wherein the p group is derived from ethylenically olefinically unsaturated dicarboxylic acid.

5. The diaryl compound-formaldehyde copolymer resin is as set forth in claim 1 wherein p is derived from an olefinically unsaturated acid.

6. The diaryl compound-formaldehyde copolymer resin as set forth in claim 1 wherein the p group is derived from an olefinically unsaturated acid and the q group is derived from an olefinically unsaturated dicarboxylic acid.

7. The diaryl compound-formaldehyde copolymer resin of claim 1 admixed with reactive diluents selected from the group consisting of vinyl aromatic monomers, alkyl esters of olefinically unsaturated carboxylic acids, vinyl esters of carboxylic acids, or mixtures thereof.

8. The composition of claim 1 wherein said unsaturated polyester resin is derived from a 1:1 ratio of maleic anhydride and propylene glycol with some dipropylene glycol units.

9. The composition of claim 1 wherein said polymerizable unsaturated monomer is styrene.

* * * * *